United States Patent Office 3,364,174
SUBSTITUTED THIOBIS PHENOLIC COMPOUNDS AND ANTIOXIDANT PROTECTION THEREWITH
Ralph Arthur Coleman, Middlesex, Frank Meritt Furman, Bridgewater Township, Somerset County, and Jerry Peter Milionis, Franklin Township, Somerset County, N.J., assignors to American Cyanamid Company, Stamford, Conn., a corporation of Maine
No Drawing. Filed Apr. 1, 1964, Ser. No. 356,644
5 Claims. (Cl. 260—45.95)

ABSTRACT OF THE DISCLOSURE

A polymeric olefin composition comprising an olefin polymer having dispersed therein in an antioxidant amount a substituted thiobis phenolic compound of the structure

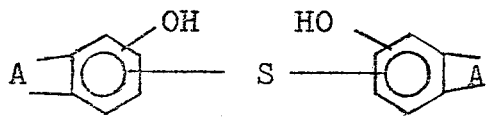

to impart to the substrate improved antioxidant protection.

---

This invention relates to new thiobis phenolic derivatives and, more particularly, to thiobis aromatic hydroxy compounds represented by the Formula I:

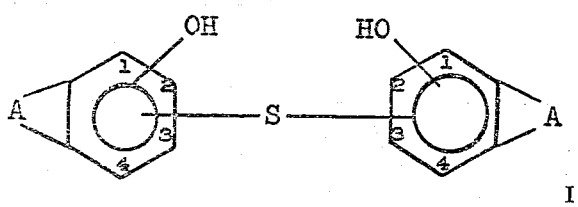

I wherein A is a trimethylene or a tetramethylene radical. The hydroxy groups may be either on the 1- or the 2- position; and when the hydroxyl group is in the 1-position, the —S— is attached to the 4-position.

The new compounds are useful as antioxidants in various types of polymeric systems, particularly polyolefins. They are effective at low concentrations, soluble in polyolefins and are heat stable. Thus, they can be milled into polyolefin formulations at high temperatures without losing effectiveness.

The compounds of this invention are conveniently prepared by the reaction of a 5,6,7,8-tetrahydro naphthol or an indanol with sulfur dichloride (SCl$_2$) in an inert solvent such as benzene, hexane, methyl cyclohexane and diethyl ether. The reaction proceeds readily at room temperature, but warming to temperatures of 40° C. or 50° C. speeds the reaction. In some instances, a catalyst (such as aluminum chloride) may be used to give improved results.

The reaction between sulfur dichloride and the indanol or tetrahydronaphthol may give mixtures of isomeric products in which the thio bridge is attached in different positions. For example, when 5,6,7,8-tetrahydro-2-naphthol is reacted with sulfur dichloride, a mixture of isomers actually results, attack taking place in the 1- and 3-positions, resulting in a mixture of the 1,1'-isomer, the 3,3'-isomer and the 1,3'-isomer. From this mixture, the 3,3'-thiobis naphthol and the corresponding 1,1'-isomer may easily be isolated in the pure state.

When 5,6,7,8-tetrahydro-1-naphthol is reacted with sulfur dichloride at room temperature, substantially only the 4,4'-isomer is obtained.

In the reaction of the indanols with sulfur chloride, the sulfur attachment is in the 4-position when the phenolic group is in the 1-position. When the phenolic group is in the 2-position, the sulfur attaches to the 3-position.

In all of the above preparations, completion of the reaction is evidenced by the precipitation of the product and also substantial decrease in the evolution of hydrogen chloride.

The compounds of this invention may be used alone or in isomeric mixtures as obtained above. They are especially useful in polyolefins such as polyethylene, polypropylene, polybutylenes and copolymers thereof. However, they are useful in polymeric materials such as polyvinyl chloride, polystyrene, acrylonitrile, butadiene-styrene copolymers, polyacrylates, nylon and other polyamides, etc.; and also in other organic compositions subject to deterioration by oxidative attack such as gasoline, lubricating oils, waxes, lard, rubber, etc.

For the purpose of protection against oxidative deterioration, the compounds of this invention are incorporated into the substrate material in an amount of broadly about 0.001 to 5.0% and, specifically, about 0.05 to about 1.0%, based on the weight of the total stabilized composition.

The invention is further illustrated by the examples which follow. Parts and percentages are on a weight basis unless otherwise specified.

EXAMPLE 1

*3,3'-thiobis(5,6,7,8-tetrahydro-2-naphthol)*

In a 250-ml. flask are charged:

74 g. (0.5 mole) 5,6,7,8-tetrahydro-2-naphthol
100 ml. ethylenedichloride and slowly 50 g. (0.37 mole) aluminum chloride then 31.8 ml. (0.5 mole) sulfur dichloride.

After stirring for 24 hours at room temperature, the mixture is drowned in one liter of water and 50 ml. of concentrated hydrochloric acid. The ethylene-dichloride is evaporated off on a steam bath and water is removed by decantation. Tar is extracted with two liters of water containing 100 ml. of 20% caustic. The extract is acidified and liquor is decanted from the tar that forms. After trituration with about 25 ml. of methanol, the solid is filtered off and hexane-washed. This material is purified by dissolving in 25 ml. of benzene and activated charcoal and reprecipitating with 25 ml. of hexane. A buff-white product (M.P. 174–176° C.) is obtained.

EXAMPLE 2

*1,1'-thiobis-5,6,7,8-tetrahydro-2-naphthol*

Into a 1-liter flask (stirrer, nitrogen blanket, ice bath) are charged:

162.8 g. (1.1 m.) 5,6,7,8-tetrahydro-2-naphthol
250.0 ml. ethyl ether

When the solid dissolves, the solution is cooled to 5° C. and a solution of:

31.6 ml. (0.5 m.) sulfur dichloride in 50.0 ml. ethyl ether is added in one hour at 5° C.

After stirring overnight at room temperature, almost all of the ether is evaporated under tap vacuum on a warm steam bath. Methylcyclohexane (250 ml.) is added. The mixture is cooled and permitted to stand. The product is filtered off and washed with hexane. The white solid (M.P. 178–184° C.) is recrystallized from 300 ml. of $CH_3OH$, giving the product (M.P. 191–193° C.).

EXAMPLE 3

*Thiobis-5,6,7,8-tetrahydro-2-naphthol (mixture of 1,1'-isomer, 1,3'-isomer and 3,3'-isomer)*

In a 2-liter flask (stirrer, nitrogen blanket) are charged:

266 g. (1.8 mole) tetrahydro-2-naphthol
450 ml. methylcyclohexane

To this, at 40° C. in 45 minutes, there is added dropwise, a solution consisting of:

75 ml. methylcyclohexane
47.4 ml. (0.75 mole) sulfur dichloride

After stirring overnight at 40° C., 300 ml. of hexane is added and the mixture is cooled to 10° C. The product is filtered off and washed with hexane. A gray white solid (M.P. 100–110° C.) is obtained after air-drying.

EXAMPLE 4

*4,4'-thiobis(5,6,7,8-tetrahydro-1-naphthol)*

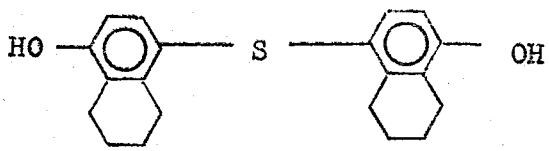

To a solution of 1.4 grams 5,6,7,8 - tetrohydro-1-naphthol in 10 ml. benzene is added, dropwise, a solution of 1.0 gram sulfur dichloride in 5 ml. benzene. The product, 4,4'-thiobis - (5,6,7,8-tetrahydro-1-naphthol), is filtered, washed with petroleum ether and air-dried (M.P. 193–200° C.).

EXAMPLE 5

*7,7'-thiobis(4-indanol)*

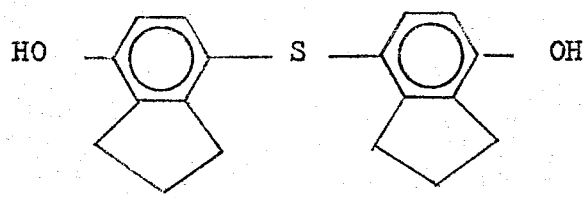

To a solution of 2.2 grams 4-indanol in 30 ml. benzene, is added, dropwise, with stirring, a solution of 2.0 grams sulfur dichloride in 20 ml. benzene. The reaction mixture is stirred for fifteen minutes and filtered. The product is isolated as a grayish-white solid (M.P. 195–204° C.).

EXAMPLE 6

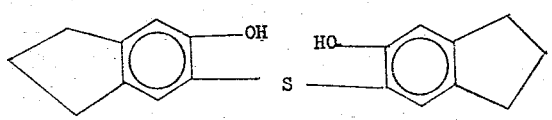

To a suspension of 6.7 grams 5-indanol in 75 ml. heptane, is added, dropwise, at room temperature, 3.0 grams sulfur dichloride in 50 ml. heptane. The reaction mixture is stirred for 60 minutes and filtered. The product, 6,6'-thiobis-(5-indanol), is purified by recrystallization from benzene (M.P. 201–203° C.).

EXAMPLE 7

*Comparative testing and use as antioxidant*

I. SAMPLE PREPARATION METHODS

A. *Solvent casting of polyethylene films.*—Polyethylene films were cast from xylene solution in the following manner. A solution of 10% polyethylene in xylene, containing 0.1% of antioxidant on the weight of resin, is cast on a glass plate heated to about 100° C. A four-inch pulldown bar with a gate of approximately 100 mills is employed to cast the solution. The material is left at 100° C. for 20 minutes and then placed in an oven at 140° C. for 20 minutes longer to evaporate off the last traces of xylene, after which time the plate is cooled and a film of about 3 to 5 mils thick is stripped off. For the oxygen uptake experiment, each sample is composed of six thicknesses of films, ⅝ inch x 2½ inches; whereas, the carbonyl formation test is performed on a single thickness of film, with the dimensions 1⅛ inches x ⅞ inch, supported on sodium chloride crystal plates.

B. *Milling and molding of polyethylene and polypropylene.*—Tests were made also on films prepared by milling and compression-molding. The milling was done on a two-roll laboratory mill. The general procedure of milling and molding the three resins is as follows: After 100 grams of resin are fluxed onto the hotter roll (about one minute), the antioxidant is added, and the material given 40 passes (about four minutes) through the mill. From the milled sheet, roughly ⅛ inch thick, a sample of about 2 inches x 2 inches is cut and molded into a film. The milling and the molding conditions employed for the various resins are tabulated.

| Resin | Milling Temperature (° F.) | | Molding | | | |
|---|---|---|---|---|---|---|
| | Front Roll | Back Roll | Temp. (° F.) | Total Force (Tons) | Time (Min.) | Film Thickness (Mils) |
| Polyethylene | 175 | 350 | 350 | 9 | 2 | 8–10 |
| Polypropylene | 350 | 375 | 350 | 25 | 5 | 15–20 |

The dimensions of the specimens taken for testing were the same as those for the solvent-cast polyethylene films, except that single thicknesses of film were used in both tests.

II. TEST METHODS

Two methods of testing were employed to determine antioxidant efficiency: (1) rate of oxygen uptake, where the film samples are subjected to pure oxygen at one atmosphere and 140° C.; and (2) rate of carbonyl formation at 140° C. in an air-circulating oven. The result for both tests is reported as an *induction period* (defined as the number of hours of protection afforded to the resin sample before oxidation commences to a significant degree). The actual numerical values are obtained by extrapolation of a curve, produced by plotting amount of oxidation vs. time, to the time-axis at "zero oxidation." The amount of oxidation for the oxygen uptake test is measured in terms of milliliters of oxygen reacted per gram of resin; and for the carbonyl formation test, by the infrared absorbence of the film samples at 5.8 to 5.9µ. Furthermore, the time required for the samples to absorb 10 cc. of oxygen per gram of resin were obtained directly from the oxygen-uptake curves.

III. TEST RESULTS

Tables I and II contain the results of oxygen uptake and carbonyl formation experiments in low density polyethylene.

Values for 1,1'-thiobis(2-naphthol) are included for comparison purposes.

Table III contains polypropylene evaluation test data.

TABLE I.—SOLVENT-CAST POLYETHYLENE FILM

| Antioxidant | Percent Conc. | Oxygen Uptake | | Carbonyl Formation Induction Period (Hours) |
| --- | --- | --- | --- | --- |
| | | Hrs. to Absorb 10 cc. $O_2$ per g. Resin | Induction Period (Hours) | |
| Control (no additive) | | 3.3 | 3.4 | 3.0 |
| 3,3'-thiobis (5,6,7,8-tetrahydro-2-naphthol) | 0.1 | 432, 331 | 439, 340 | 8.1 |
| 1,1'-thiobis(2-naphthol) | 0.1 | 110 | 125 | 32.3 |

TABLE II—MOLDED POLYETHYLENE FILM
[Antioxidant at 0.1% conc.]

| Antioxidant | Oxygen Uptake | | Carbonyl Formation Induction Period (Hours) |
| --- | --- | --- | --- |
| | Hrs. to Absorb 10 cc. $O_2$ per g. Resin | Induction Period (Hours) | |
| Control (no additive) | 2.5 | 2.0 | 3.3 |
| 3,3'-thiobis(5,6,7,8-tetrahydro-2-naphthol) | 322.0 | 318.0 | 74.0 |
| Isomeric Mixture: | | | |
| Thiobis(5,6,7,8-tetrahydro-2-naphthol) | 335 | 340.0 | 143.5; 155 |
| 6,6'-thiobis(5-indanol) | 225 | 235 | 49–65 |
| 7,7'-thiobis(4-indanol) | 98 | 100 | 120; 104 |
| 1,1'-thiobis(2-naphthol) | 56.5 | 54.5 | 33.5 |

TABLE III—POLYPROPYLENE (SAMPLE PREPARATION) METHOD B

| Antioxidant | Percent Conc. | Oxygen Uptake, 140° C. Induction Period (Hours) | Carbonyl Formation Induction Period (Hours) |
| --- | --- | --- | --- |
| Control (no additive) | | 0.5 | 2.2 |
| 3,3'-thiobis(5,6,7,8-tetrahydro-2-naphthol) | 0.2 | 34.0 | 25.8 |
| Isomeric mixture: | | | |
| Thiobis(5,6,7,8-tetrahydro-2-naphthol) | 0.25 | | 50 |
| 4,4'-thiobis(5,6,7,8-tetrahydro-1-naphthol) | 0.2 | | 49 |

We claim:

1. A composition consisting essentially of a polyolefin and from 0.001% to 5.0% by weight, of a compound represented by the formula:

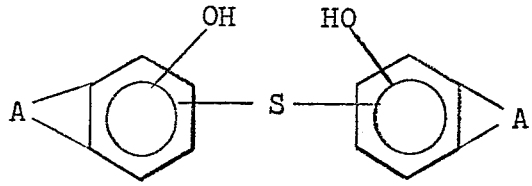

wherein A is selected from the group consisting of trimethylene and tetramethylene chains.

2. An olefin polymer selected from the group consisting of polyethylene, polypropylene, and ethylene-propylene copolymers which polymers have been rendered resistant to deteriorative action of oxygen by incorporating therein in an antioxidant amount, a substituted thiobis phenol compound of the structure

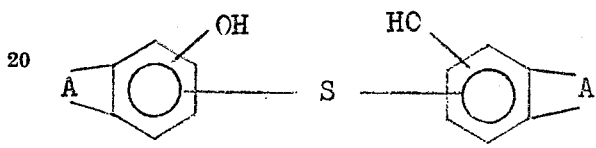

wherein A is selected from the group consisting of trimethylene and tetramethylene chains.

3. The polyolefin composition of claim 2 wherein the substituted thiobis phenol compound has the following structure

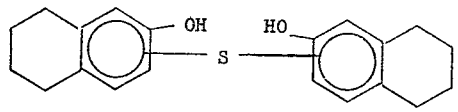

4. The polyolefin composition of claim 2, wherein the substituted thiobis phenol compound has the following structure

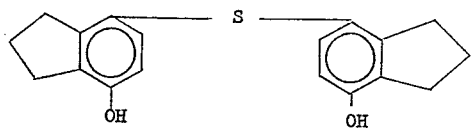

5. The polyolefin composition of claim 2, wherein the substituted thiobis phenol compound has the following structure

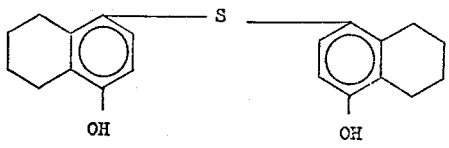

References Cited

UNITED STATES PATENTS 3,252,911    5/1966    Orloff _____ 260—45.95 X

OTHER REFERENCES

Mousseron, Compt. rend. 215, 1942, pp. 357, 359.

DONALD E. CZAJA, *Primary Examiner.*

M. J. WELSH, *Assistant Examiner.*